United States Patent
Fiedler et al.

[15] 3,695,376
[45] Oct. 3, 1972

[54] SAFETY INSTALLATION FOR THE VENTING AND PRESSURE RELEASE OF CLOSED CONTAINERS

[72] Inventors: Horst Fiedler, Stuttgart-Fasanenhof; Ludwig Fricker, Stuttgart-Feuerbach, both of Germany

[73] Assignee: Daimler-Benz Aktiengesellschaft, Stuttgart-Unterturkheim, Germany

[22] Filed: Aug. 21, 1970

[21] Appl. No.: 65,997

[30] Foreign Application Priority Data
Aug. 23, 1969  Germany..........P 19 42 963.1

[52] U.S. Cl.................180/54 R, 123/136, 137/116, 137/118, 137/493.8, 137/512
[51] Int. Cl..........................................B60k 15/02
[58] Field of Search..180/54 R; 137/116, 118, 493.8, 137/493, 512; 123/136, 119 B

[56] References Cited
UNITED STATES PATENTS 2,351,874   6/1944   Parker....................137/493.8
2,543,665   2/1951   Meierhoff...........137/493.8 X
3,092,091   6/1963   Bosley.................137/493.8 X
3,172,348   3/1965   Berg....................123/136 U X
3,517,654   6/1970   Sarto et al. .................123/136

Primary Examiner—Benjamin Hersh
Assistant Examiner—Milton L. Smith
Attorney—Craig and Antonelli

[57] ABSTRACT

An installation for the venting and the pressure control of tanks preferably provided with an equalization container, especially of a fuel tank in motor vehicles provided with an equalization tank connected downstream thereof, in which the line coming from the equalization tank is provided with at least one venting valve and one pressure release valve of which the venting valve is connected by way of a vent line with the crankcase of the engine.

41 Claims, 4 Drawing Figures

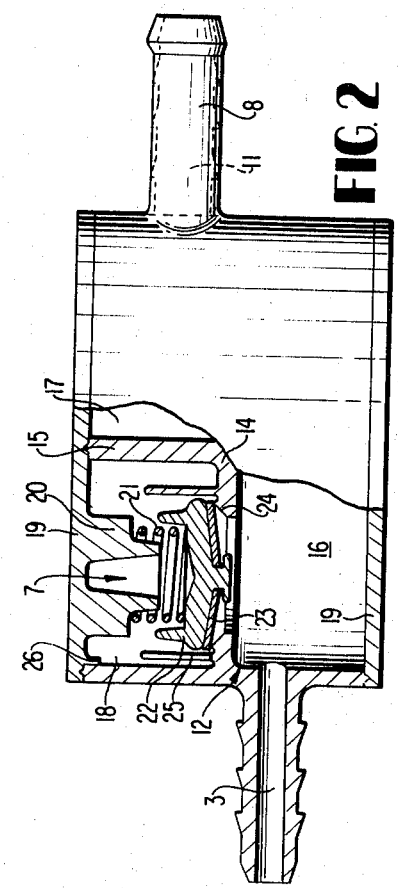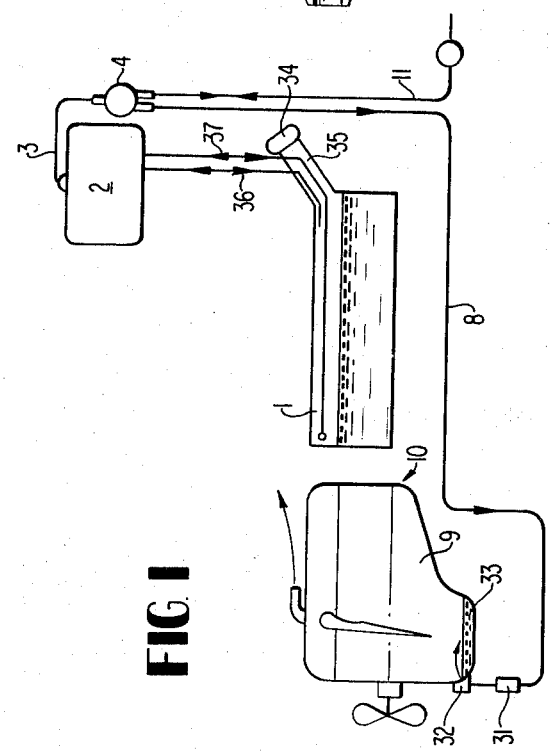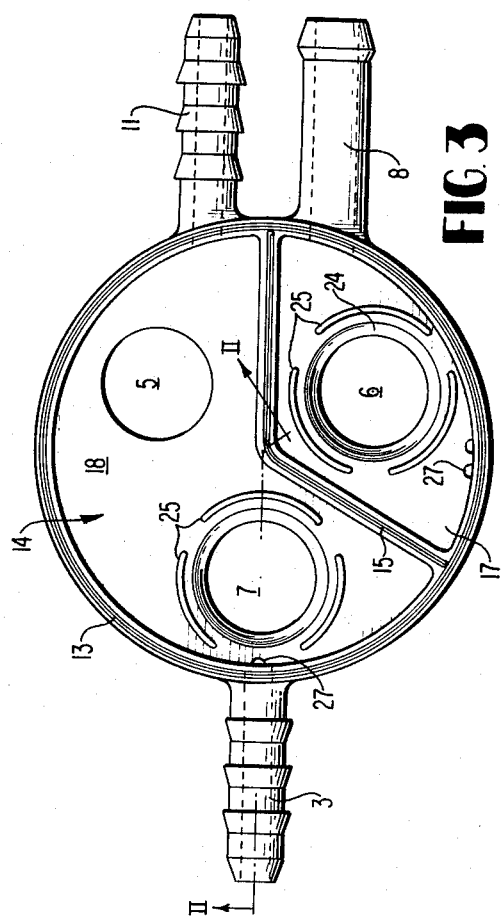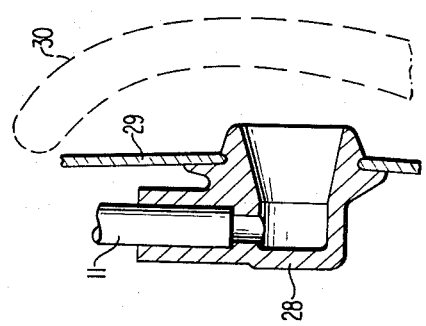

SAFETY INSTALLATION FOR THE VENTING AND PRESSURE RELEASE OF CLOSED CONTAINERS

The present invention relates to an installation for the venting and pressure regulation of containers or tanks preferably provided with expansion vessels or tanks, especially of a fuel tank in motor vehicles provided with an expansion tank connected downstream thereof.

The fuel tanks of motor vehicles must be in communication with the atmosphere because the fuel volume in the tank is subjected to a constant change both during the operation of the vehicle as a result of fuel consumption and the refilling of fuel as also during standstill of the motor vehicle by the atmospheric influences such as heat, cold, air pressure, etc. The connection of the fuel tank to the atmosphere, however, not only takes care of a volume compensation during a decrease or increase of the fuel volume but unfavorably also for the fact that an emission of poisionous hydrocarbons into the atmosphere takes place as a result of the evaporation of readily volatile hydrocarbon components. With the known fuel tanks the venting and pressure control of the tank takes place by way of a valve disposed in the closure lid of the filler pipe. These prior art installations, however, entail the disadvantage that they cannot prevent the emission of hydrocarbons into the atmosphere. Additionally, it cannot be avoided in such prior art installations, that, for example, when the vehicle rolls over as a result of an accident, fuel runs out when an equalization or expansion tank is provided. The danger of an ignition of the fuel is increased thereby.

Known in the prior art are venting and pressure control installations in which the gases are fed by way of a complicated valve control to the engine vent system so that the emission of hydrocarbons is decreased. These venting and pressure control installations, however, are very prone to breakdowns and relatively expensive by reason of the constructive expenditures. Additionally, they entail the further disadvantage that the specific heavy fuel vapors are introduced into the engine venting system at the top side of the engine so that they deposit in the downward direction during the condensation through the engine.

The present invention is concerned with the task to avoid the disadvantages of prior art venting and pressure control installations of closed tanks and provide with simple constructive means a venting and pressure release installation which prevents emission of hydrocarbons into the atmosphere.

The underlying problems are solved according to the present invention in that at least one vent valve and one pressure release valve are arranged in the line coming from the equalization tank, of which the vent valve is connected with the crank case of the engine. This construction avoids complicated and expensive control installations and offers the advantage that the specific heavy fuel vapors are introduced in a direction from the bottom toward the top into the engine housing. It is thereby very advantageous if additionally a safety excess pressure valve is provided which is combined with the vent valve and pressure release valve into a valve unit. The valve unit may appropriately consist of a single housing which is provided with one connecting nipple each for the vent-line, the pressure release line and the connecting line to the equalization tank. The accommodation of the three valves in one housing has the advantage that the entire valve unit can be mounted and interchanged very readily.

According to a further advantageous feature of the present invention the housing of the valve unit may consist of a sleeve which is subdivided in the cross-sectional plane into two equally large sections by a wall provided with three valve seats, of which one section is subdivided by a web subtending an angle of about 120° so that three chambers, namely the equalization chamber, the vent chamber and the pressure release chamber are formed, in which terminate the corresponding connecting pipes or nipples. Advantageously the valve housing is closed at both ends by two symmetric covers secured and locked in the housing, which receive the valve elements, preferably the guide cylinders, coil springs, valve pressure plates and sealing discs and so press against the valve seats that the chambers are closed with respect to each other in the normal, rest position. The use of symmetrical closure lids or covers offers the advantage that the covers can be exchanged at any time with one another and only one mold is needed in connection with the manufacture so that the price of the valve unit can be kept low. In order that the mix-up and an erroneous insertion of the cover is not possible, small stop or locking bolts are provided at the cover edge which engage corresponding with webs arranged in the housing.

The valve unit may, in order to keep down the price and to save as much weight as possible, be manufactured from synthetic resinous materials of any suitable conventional type so that the covers can be welded to the housing in a simple manner, for example, with the aid of ultrasonics.

The valves are so arranged in the housing that the safety excess pressure valve and the pressure release valve close the pressure release chamber with respect to the equalization chamber and the safety excess pressure valve opens the pressure release chamber with respect to the equalization chamber in case of excess pressure in the equalization chamber and the pressure release valve opens the pressure release chamber with respect to the equalization chamber in case of vacuum in the equalization chamber.

It is also very appropriate if the venting valve closes the venting chamber with respect to the equalization chamber and in case of excess pressure in the equalization chamber and/or in case of vacuum in the vent line, opens the vent chamber with respect to the equalization chamber. This means therefore, that in case of an excess pressure in the equalization chamber or in the equalization or expansion tank of the fuel tank, either the safety excess pressure valve opens the pressure release line or the vent valve opens the vent line toward the engine. However, since the discharge of hydrocarbons through the pressure release line is to be avoided as much as possible, it is appropriate if the valve prestress forces of the safety excess pressure valve and of the venting valve are so selected that with a predetermined excess pressure, at first the venting valve opens so that the gases can escape into the vent line to the crankcase of the engine. Only with a very large excess pressure which might become dangerous for the fuel tank, the equalization tank as well as for the entire installation, the safety excess pressure valve additionally opens so that the gases can escape directly through the pressure release line into the free atmosphere and a danger arising as a result of an excessively large pressure in the fuel tank can be eliminated immediately.

It has also been found as very appropriate if the valves respond preferably to the following pressure ranges:

Safety excess pressure valve:
  about 0.055 atmospheric excess pressure
Pressure release valve:
  about 0.018 atmospheric excess pressure
Vent valve:
  about 0.025 atmospheric excess pressure It is very advantageous if the pressure release line connected to the pressure release chamber of the valve unit terminates preferably in a rubber sleeve open toward the atmosphere which is arranged covered in the vehicle body. For example, the rubber sleeve may terminate in the free atmosphere below the rear bumper so that the penetration of dirt particles and a damaging may be advantageously avoided. If hydrocarbons should possibly leave by way of the rubber sleeve into the atmosphere, then an entry of these hydrocarbons opposite the driving direction into a possibly open window is prevented by the selected arrangement of the rubber sleeve.

According to a further advantageous feature of the present invention, the vent line connected with the vent chamber of the valve unit may terminate by way of an explosion protection device of any conventional construction through an inlet aperture directly in the crankcase of the engine within the area of the oil level. This offers the advantage that the specific heavy gasoline vapors build up from the bottom in the upward direction above the oil level before they condensate. In case of an excess pressure in the equalization tank, the gases reach the crankcase by way of the first opening vent valve and of the vent line, and are fed by way of the crankcase vent line and the carburetor to the suction pipe. Since the vent valve opens the vent chamber only in the direction toward the engine, there exists no danger that in case of a vacuum in the equalization tank or in the equalization chamber, oil will be sucked into the equalization tank out of the crankcase of the engine.

The equalization or expansion tank is so selected and dimensioned in its size that with a filled fuel tank and a heating up of the fuel to about 30° C., the volume expansion of the fluid is absorbed in the equalization tank and no fuel can reach the valve or the engine by way of the vent line.

It is very advantageous if the equalization tank is arranged above the filler inlet of the tank filler pipe and is in communication with the tank by way of at least two lines. It is prevented thereby that with a filled fuel tank, fuel can flow into the equalization tank without a change in volume of the fuel volume taking place. With this arrangement of the valve unit, of the equalization tank and of the fuel tank, it is precluded in a very advantageous manner that in case of a rolling or turning over of the motor vehicle and with a motor vehicle resting on its top, fuel can flow out into atmosphere, for during the outflow of the fuel out of the fuel tank into the equalization tank, a vacuum results in the fuel tank since no air can flow in behind the fuel. Furthermore, the valve forces of the safety excess pressure valve and of the vent valve would have to be overcome, and finally the pressure release aperture of the pressure release line is disposed in the rubber sleeve above the fuel level in the fuel tank when the vehicle lies on its top.

According to a further advantageous feature of the present invention, the two connecting lines between the equalization tank and the fuel tank may terminate at two oppositely disposed sides, preferably at both ends pointing in and opposite the driving direction. It is assured thereby that with a vehicle standing on an uphill or downhill incline, one of the two lines seizes the air bubble present in the fuel tank so that the fuel gases collecting thereat can be sucked off by the engine by way of the vent line.

Accordingly, it is an object of the present invention to provide a safety installation for the venting and pressure release of closed tanks, especially of closed fuel tanks in motor vehicles which avoid by simple means the aforementioned shortcomings and drawbacks encountered in the prior art.

Another object of the present invention resides in a safety installation for motor vehicle fuel tanks which precludes the emission of poisonous hydrocarbons into the atmosphere without requiring expensive and costly structures.

A further object of the present invention resides in a safety installation of fuel tanks for motor vehicles which minimizes the danger of escape of fuel into the atmosphere when the vehicle turns over in case of an accident.

A still further object of the present invention resides in a fuel tank safety installation for venting and controlling the pressure of fuel tanks which avoids complicated and expensive control units in favor of a simple valve unit that can be readily preassembled.

Still another object of the present invention resides in a safety installation for closed tanks of the type described above which minimizes the manufacturing costs of the various parts while at the same time increasing reliability in operation for its intended purposes.

These and further objects, features and advantages of the present invention will become more obvious from the following description when taken in connection with the accompanying drawings which shows, for purposes of illustration only, one embodiment in accordance with the present invention, and wherein:

FIG. 1 is a schematic view of the overall installation for the ventilation and pressure control of the fuel tank with a valve unit in accordance with the present invention.

FIG. 2 is a partial cross-sectional view through the valve unit taken along line II—II of FIG. 3.

FIG. 3 is a top plan view of the valve unit of FIG. 2 with the cover removed therefrom, and FIG. 4 is a partial cross-sectional view through the end of the pressure release line provided with a rubber sleeve in accordance with the present invention.

Referring now to the drawing wherein like reference numerals are used throughout the various views to designate like parts, and more particularly to FIG. 1, reference numeral 1 designates in this figure a fuel tank while reference numeral 2 designates an equalization or expansion tank. A valve unit 4 is arranged in the line 3 leading from the equalization tank 2 of the fuel tank 1. The valve unit 4 consists, as can be seen from FIGS. 2 and 3, of a pressure release valve 5, of a vent valve 6 and of an excess pressure safety valve 7. The valve unit 4 is in communication by way of the vent line 8 with the crankcase 9 of the engine 10 and by way of the pressure release line 11 with the free atmosphere.

It can be seen from FIG. 2 that the valve unit 4 consists of a housing generally designated by reference numeral 12 which is provided with one connecting nipple each for the pressure release line 11, for the vent line 8 and for the connecting line 3 leading to the equalization tank vessel 2. The housing 12 consists of a sleeve 13 which is divided in the cross-sectional plane into two equally large sections by a wall generally designated by reference numeral 14 and provided with three valve seats; one of these two sections is again subdivided by a web 15 forming approximately an angle of 120° so that three chambers, namely the equalization chamber 16, which is in communication by way of the equalization line 3 with the equalization tank 2, the vent chamber 17 and the pressure control chamber 18 are formed. The vent line 8 terminates in the vent chamber 17 and the pressure release line 11 terminates in the pressure release chamber 18 which is in communication with the free atmosphere.

The housing 12 of the valve unit 4 is closed at its two ends by two symmetrical covers 19 held in the housing 12. The valve elements are pressed against the valve seats of the valves 5, 6 and 7 by the covers 19. The valve elements consist each of a guide cylinder 20, a coil spring 21, a valve pressure plate 22 and a rubber sealing disc 23 which is pressed by the spring loaded valve plate against the valve seat 24 of the valves 5, 6 and 7. Depending upon the strength of the coil spring 21 the valve pressure can be selected at will. Guide webs 25 are arranged about the valve seats which prevent that during the lifting of the valve pressure plate as a result of an excess pressure in the equalization tank 2 or in the equalization chamber 16, the valve elements are displaced laterally and as a result thereof the valve no longer closes correctly. For this reason the valve pressure plates 22 are also slightly rounded off at the edges in order that they cannot cant or jam in case of an inclined lifting off. It is assured thereby that the valves close well also after an extreme stroke.

The covers 19, which as also the entire valve unit may be made advantageously of any conventional synthetic resinous material and are welded to the valve housing 12 by means of ultrasonics, possess at the inner edge thereof guide webs 26 (FIG. 2), which engage in corresponding webs 27 (FIG. 3) at the inner edge of the housing. It is prevented thereby that the cover is mounted incorrectly.

It can be seen from FIG. 3 that the safety excess pressure valve 7 and the pressure control valve 5 close the pressure control chamber 18 with respect to the equalization chamber 16. If an excess pressure prevails in the equalization tank 2 or in the equalization chamber 16, then the venting valve 6, which closes the venting chamber 17 with respect to the equalization chamber 16, is pushed open as a result of the excess pressure and the gases escape into the vent line 8 to the crankcase 9 of the engine 10. If this excess pressure in the equalization tank 2 or in the equalization chamber 16 exceeds a predetermined value matched to normal conditions, then the excess pressure valve 7 opens additionally so that the gases cannot only enter into the vent line 8 but also into the pressure release chamber 18 and therewith into the pressure release line 11 and may therefore escape into the atmosphere.

It can be seen from FIG. 4 that the pressure release line 11 connected to the pressure control chamber 18 of the valve unit 4 terminates in the rubber sleeve 28 open in the direction toward the atmosphere which is arranged in the vehicle body 29 covered, for example, behind the bumper 30. The rubber sleeve 28 may also be covered by a sieve in order that a soiling of the pressure release line 11 and therewith an entering of dirt particles into the equalization vessel 2 is prevented. The sieve is now shown in FIG. 4 and may be of any conventional construction. The enlarged opening of the rubber sleeve 28 is provided for the purpose that as small as possible a suction air velocity is present in the suction line. Additionally, a freezing or icing of the rubber sleeve is advantageously prevented thereby.

The vent line 8 connected to the venting chamber 17 of the valve unit 4 leads by way of an explosion protection 31 through an inlet aperture 32 directly into the crankcase 9 of the engine 10 within the area of the oil level 33 (FIG. 1).

It is further illustrated in FIG. 1 that the equalization tank 2 is arranged above the filling opening 34 of the filler pipe 35 of the tank and is in communication with the tank 1 by way of at least two lines 36 and 37. The connecting line 36 terminates at the rearward portion of the tank 1, as viewed in the driving direction, while the connecting line 37 terminates at the forward portion of the tank 1. It is achieved thereby advantageously that in case of an inclined position of the vehicle, at least one of the two connecting lines 36 and 37 seizes the air bubble present in the tank 1.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. An installation for the venting and pressure release of tanks, characterized in that at least one pressure release valve means and one venting valve means is arranged in a connecting line coming from a tank, in that said venting valve means is operatively connected with the crankcase of an engine, in that said tank is provided with an equalization tank means and in that said connecting line means comes from said equalization tank means, and in that a safety excess pressure valve means is additionally provided which is combined with the venting and pressure release valve means into a structural valve unit.

2. An installation according to claim 1, characterized in that the structural valve unit consists of a housing that includes a connection means each for a pressure release line, a vent line and said connecting line leading to the equalization tank means.

3. An installation according to claim 2, characterized in that the pressure release line connected to the pressure release chamber of the valve unit terminates in a rubber sleeve means that is arranged, covered in the vehicle body.

4. An installation according to claim 3, characterized in that said rubber sleeve means is open toward the atmosphere.

5. An installation according to claim 2, characterized in that the venting line connected to a venting chamber of the valve unit terminates by way of an inlet aperture directly in the crankcase of the engine within the area of the oil level.

6. An installation according to claim 5, characterized in that said venting line terminates in the crankcase through said inlet aperture and by way of an explosion protection means.

7. An installation according to claim 1, characterized in that the valve means respond to the following pressure ranges:
safety excess pressure valve means to about 0.055 atmospheric excess pressure;
pressure release valve means to about 0.018 atmospheric excess pressure, and
venting valve means to about 0.025 atmospheric excess pressure.

8. An installation for the venting and pressure release of tanks, comprising: an equalization tank means communicating with a tank, a connecting line leading from said equalization tank means to the crankcase of an engine, at least one pressure release valve means in communication with the equalization tank means, a safety excess pressure valve means in communication with the equalization tank means, a venting valve means arranged in said connecting line, and a housing for combining the above mentioned three valve means into a structural valve unit, said housing including a connection means each for a pressure release line, a vent line and for a line connecting the structural valve unit to the equalizer tank means, said housing further including a sleeve means which is divided in a cross plane into two approximately equal sections by a wall means provided with three valve seat means, one of said sections being further subdivided by a web means so that three chambers are formed consisting of an equalization chamber, a venting chamber and a pressure release chamber which terminate in corresponding connection means.

9. An installation according to claim 8, characterized in that said web means subtends an angle of about 120°.

10. An installation according to claim 8, characterized in that said valve housing is closed at both its two ends by two substantially symmetrical cover means held in said housing, said cover means receiving the valve elements and pressing against the valve seat means in such a manner that the chambers are closed with respect to each other in the normal position.

11. An installation according to claim 10, characterized in that said valve elements include guide cylinder means, coil spring means, valve pressure plate means and sealing disc means.

12. An installation according to claim 10, characterized in that the safety excess pressure valve means and the pressure release valve means close the pressure release chamber with respect to the equalization chamber and in that the safety excess pressure valve means opens the pressure release chamber with respect to the equalization chamber in case of an excess pressure in the equalization chamber and the pressure release valve means opens the pressure release chamber with respect to the equalization chamber in case of a vacuum in the equalization chamber.

13. An installation according to claim 12, characterized in that the venting valve means closes the venting chamber with respect to the equalization chamber and opens the venting chamber with respect to the equalization chamber in case of an excess pressure in the equalization chamber and/or a vacuum in the vent line.

14. An installation according to claim 13, characterized in that the valve means respond to the following pressure ranges:
safety excess pressure valve means to about 0.055 atmospheric excess pressure;
pressure release valve means to about 0.018 atmospheric excess pressure, and
venting valve means to about 0.025 atmospheric excess pressure.

15. An installation according to claim 13, characterized in that the pressure release line connected to the pressure release chamber of the valve unit terminates in a rubber sleeve means that is arranged, covered in the vehicle body.

16. An installation according to claim 15, characterized in that said rubber sleeve means is open toward the atmosphere.

17. An installation according to claim 16, characterized in that the venting line connected to the venting chamber of the valve unit terminates by way of an inlet aperture directly in the crankcase of the engine within the area of the oil level.

18. An installation according to claim 17, characterized in that said venting line terminates in the crankcase through said inlet aperture and by way of an explosion protection means.

19. An installation according to claim 17, characterized in that the equalization tank means is arranged above the inlet aperture of a filler pipe for said tank and is in communication with said tank by way of at least two lines.

20. An installation according to claim 19, characterized in that said two connecting lines terminate at mutually opposite sides of the tank.

21. An installation according to claim 16, characterized in that said two connecting lines terminate at the two ends of said tank pointing in and opposite the driving direction of the vehicle.

22. An installation according to claim 21, characterized in that the valve means respons to the following pressure ranges:
safety excess pressure valve means to about 0.055 atmospheric excess pressure;
pressure release valve means to about 0.018 atmospheric excess pressure, and
venting valve means to about 0.025 atmospheric excess pressure.

23. An installation according to claim 22, characterized in that said valve elements include guide cylinder means, coil spring means, valve pressure plate means and sealing disc means.

24. An installation according to claim 23, characterized in that said tank is a fuel tank in a motor vehicle.

25. An installation according to claim 8, characterized in that the safety excess pressure valve means and the pressure release valve means close the pressure release chamber with respect to the equalization chamber and in that the safety excess pressure valve means opens the pressure release chamber with respect to the equalization chamber in case of an excess pressure in the equalization chamber and the pressure release valve means opens the pressure release chamber with respect to the equalization chamber in case of a vacuum in the equalization chamber.

26. An installation according to claim 8, characterized in that the venting valve means closes the venting chamber with respect to the equalization chamber and opens the venting chamber with respect to the equalization chamber in case of an excess pressure in the equalization chamber and/or a vacuum in the vent line.

27. An installation according to claim 8, characterized in that the equalization tank means is arranged above the inlet aperture of a filler pipe for said tank and is in communication with said tank by way of at least two lines.

28. An installation according to claim 27, characterized in that said two connecting lines terminate at mutually opposite sides of the tank.

29. An installation according to claim 28, characterized in that said two connecting lines terminate at the two ends of said tank pointing in and opposite the driving direction of the vehicle.

30. An installation for venting and pressure release of tanks, comprising: an equalization tank means communicating with a tank, a connecting line leading from said equalization tank means to the crankcase of an engine, at least one pressure release valve means in communication with the equalization tank means, a safety excess pressure valve means in communication with the equalization tank means, a venting valve means arranged in said connecting line, and a housing for combining the above mentioned three valve means into a structural valve unit, said housing including a connection means each for a pressure release line, a vent line and for a line connecting the structural valve unit to the equalizer tank means, said valve housing being closed at both its two ends by two substantially symmetrical cover means held in said housing, said cover means receiving the valve elements and pressing against the valve seat means in such a manner that chambers of said housing are closed with respect to each other in the normal position.

31. An installation for the venting and pressure release of tanks, especially fuel tanks of an automotive vehicle which supply fuel to an engine with a crankcase; said installation comprising: an equalizing tank spaced from the fuel tank, at least one conduit for communicating said equalizing tank with the fuel tank, pressure release valve means for communicating said equalizing tank with atmosphere when said equalizing tank is in a first predetermined pressure range with respect to the atmosphere, venting valve means for communicating said equalizing tank with the crankcase when said equalizing tank is in a second predetermined pressure range with respect to the crankcase, and an excess pressure safety valve means for communicating said equalizing tank with atmosphere when the pressure in said equalizing tank is in a third predetermined pressure range with respect to the atmosphere.

32. An installation according to claim 31, wherein said first predetermined pressure range includes all equalizing tank pressures below a certain predetermined pressure.

33. An installation according to claim 32, wherein said third predetermined pressure range includes all equalizing tank pressures above a certain predetermined pressure.

34. An installation according to claim 33, wherein said equalizing tank is disposed above the fuel tank and wherein at least two conduits communicate the fuel tank to the equalizing tank.

35. An installation according to claim 33, characterized in that the valve means responds to the following pressure ranges: safety excess pressure valve means to about 0.055 atmospheric excess pressure; pressure release valve means to about 0.018 atmospheric excess pressure, and venting valve means to about 0.025 atmospheric excess pressure.

36. An installation according to claim 35, wherein said equalizing tank is disposed above the fuel tank and wherein at least two conduits communicate the fuel tank to the equalizing tank.

37. An installation according to claim 33, wherein a venting conduit is provided between said venting valve means and said crankcase, said venting conduit being connected at a lower zone of the crankcase at a point immediately above the height of the oil level in the crankcase.

38. An installation according to claim 33, wherein said pressure release valve means includes a movable pressure release valve member arranged for selectively opening and closing a first opening between a chamber communicating directly with the equalizing tank and a chamber communicating directly with atmosphere, wherein said venting valve means includes a movable venting valve member arranged for selectively opening and closing a second opening between a chamber communicating directly with the equalization tank and a chamber communicating directly with the crankcase, wherein said excess pressure safety valve means includes a movable safety valve member arranged for selectively opening and closing a third opening between a chamber communicating directly with the equalizing tank and a chamber communicating directly with atmosphere, and wherein said above recited valve members and chambers are all located in a common housing.

39. An installation according to claim 33, wherein a common housing is provided with first, second and third separate chambers, said first chamber being in direct communication with said equalizing tank by open conduit means, said second chamber being in direct communication with atmosphere by open conduit means, said third chamber being in direct communication with said crankcase by open conduit means, said second chamber being in communication with said first chamber by way of a pressure release valve structure forming part of said pressure release valve means and by way of an excess pressure safety valve structure forming part of said excess pressure safety valve means, said third chamber being in communication with said first chamber only by way of a venting valve structure forming part of said venting valve means.

40. An installation according to claim 31, wherein said third predetermined pressure range includes all equalizing tank pressures above a certain predetermined pressure.

41. An installation according to claim 31, wherein a venting conduit is provided between said venting valve means and said crankcase, said venting conduit being connected at a lower zone of the crankcase at a point immediately above the height of the oil level in the crankcase.

* * * * *